United States Patent
Muir et al.

(10) Patent No.: US 7,359,953 B2
(45) Date of Patent: *Apr. 15, 2008

(54) METHODS AND APPARATUS FOR MAKING A HYPERMEDIUM INTERACTIVE

(75) Inventors: Jeff Muir, Delray Beach, FL (US); Andrew L. Stergiades, Boca Raton, FL (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 907 days.

This patent is subject to a terminal disclaimer.

(21) Appl. No.: 10/689,824

(22) Filed: Oct. 20, 2003

(65) Prior Publication Data

US 2004/0139117 A1    Jul. 15, 2004

Related U.S. Application Data

(63) Continuation of application No. 10/068,790, filed on Feb. 6, 2002, now Pat. No. 6,691,157, which is a continuation of application No. 09/247,220, filed on Feb. 10, 1999, now Pat. No. 6,370,570, which is a continuation of application No. 08/556,623, filed on Nov. 13, 1995, now Pat. No. 6,088,515.

(51) Int. Cl.
*G06F 15/16*    (2006.01)
*G06F 17/00*    (2006.01)

(52) U.S. Cl. .................. 709/217; 709/218; 709/219; 709/203; 709/229; 709/201; 715/501.1; 715/513

(58) Field of Classification Search ............... 709/217, 709/218, 219, 203, 229, 201; 707/10, 501.1, 707/513; 345/333, 335, 346; 711/132; 715/513, 715/501, 715/501.1

See application file for complete search history.

(56) References Cited

U.S. PATENT DOCUMENTS

4,499,499 A    2/1985    Brickman et al.

(Continued)

FOREIGN PATENT DOCUMENTS

EP    0381645 A2    8/1990

(Continued)

OTHER PUBLICATIONS

Smith, John et al. "ABC: A Hypermedia System for Artifact-Based Collaboration." Proceedings of the third annual ACM conference on Hypertext. ACM Press. Dec. 1991. 179-192.*

(Continued)

*Primary Examiner*—Jason Cardone
*Assistant Examiner*—Jeffrey R Swearingen
(74) *Attorney, Agent, or Firm*—Choate Hall & Stewart LLP; John D. Lanza, Esq.; Leigh J. Martinson, Esq.

(57) ABSTRACT

A system and method of making a hypermedium page interactive. In one embodiment the system includes a hyperlink on the hypermedium page displayed on a client node; a hyperlink configuration file (corresponding to the hyperlink on the client node) located on a network server node; and a client agent located on the client node. In response to a user selecting the hyperlink on the hypermedium page, the client agent establishes a communications link from the client agent to an application execution server agent on an application server using the information located in the configuration file obtained from the network server node. In response to the creation of the communications link between the application execution server agent and the client agent, the application executes on the application execution server and the user is capable of interactively using the application running on the application execution node from the client node. Data input and display occurs at the client node under the control of the client agent.

21 Claims, 2 Drawing Sheets

U.S. PATENT DOCUMENTS

| | | | |
|---|---|---|---|
| 4,887,204 A | 12/1989 | Johnson et al. |
| 4,937,784 A | 6/1990 | Masai et al. |
| 5,014,221 A | 5/1991 | Mogul |
| 5,031,089 A | 7/1991 | Liu et al. |
| 5,175,852 A | 12/1992 | Johnson et al. |
| 5,202,971 A | 4/1993 | Henson et al. |
| 5,233,701 A | 8/1993 | Nakata |
| 5,249,290 A | 9/1993 | Heizer |
| 5,297,249 A | 3/1994 | Bernstein et al. |
| 5,325,527 A | 6/1994 | Cwikowski et al. |
| 5,329,619 A | 7/1994 | Page et al. |
| 5,341,477 A | 8/1994 | Pitkin et al. |
| 5,341,478 A | 8/1994 | Travis, Jr. et al. |
| 5,367,688 A | 11/1994 | Croll |
| 5,414,457 A | 5/1995 | Kadowaki et al. |
| 5,473,599 A | 12/1995 | Li et al. |
| 5,485,460 A | 1/1996 | Schrier et al. |
| 5,499,343 A | 3/1996 | Pettus |
| 5,515,508 A | 5/1996 | Pettus et al. |
| 5,526,492 A | 6/1996 | Ishida |
| 5,530,852 A | 6/1996 | Meske, Jr. et al. |
| 5,537,546 A | 7/1996 | Sauter |
| 5,548,726 A | 8/1996 | Pettus |
| 5,553,242 A | 9/1996 | Russell et al. |
| 5,557,732 A | 9/1996 | Thompson |
| 5,557,748 A | 9/1996 | Norris |
| 5,561,769 A | 10/1996 | Kumar et al. |
| 5,572,643 A | 11/1996 | Judson |
| 5,572,674 A | 11/1996 | Ernst |
| 5,577,188 A | 11/1996 | Zhu |
| 5,579,469 A | 11/1996 | Pike |
| 5,583,992 A | 12/1996 | Kudo |
| 5,596,745 A | 1/1997 | Lai et al. |
| 5,606,493 A | 2/1997 | Duscher et al. |
| 5,623,603 A | 4/1997 | Jiang et al. |
| 5,623,656 A | 4/1997 | Lyons |
| 5,644,720 A | 7/1997 | Boll et al. |
| 5,657,390 A | 8/1997 | Elgamal et al. |
| 5,680,549 A | 10/1997 | Raynak et al. |
| 5,701,451 A | 12/1997 | Rogers et al. |
| 5,706,437 A | 1/1998 | Kirchner et al. |
| 5,710,918 A | 1/1998 | Lagarde et al. |
| 5,721,876 A | 2/1998 | Yu et al. |
| 5,734,865 A | 3/1998 | Yu |
| 5,752,246 A * | 5/1998 | Rogers et al. ............... 709/239 |
| 5,754,830 A | 5/1998 | Butts et al. |
| 5,761,507 A | 6/1998 | Govett |
| 5,761,656 A | 6/1998 | Ben-Shachar |
| 5,764,908 A | 6/1998 | Shoji et al. |
| 5,764,915 A | 6/1998 | Heimsoth et al. |
| 5,802,258 A | 9/1998 | Chen |
| 5,802,306 A | 9/1998 | Hunt |
| 5,812,784 A | 9/1998 | Watson et al. |
| 5,826,027 A | 10/1998 | Pedersen et al. |
| 5,828,840 A | 10/1998 | Cowan et al. |
| 5,838,906 A | 11/1998 | Doyle et al. |
| 5,838,910 A | 11/1998 | Domenikos et al. |
| 5,838,916 A | 11/1998 | Domenikos et al. |
| 5,872,973 A | 2/1999 | Mitchell et al. |
| 5,909,545 A | 6/1999 | Frese, II et al. |
| 5,938,733 A | 8/1999 | Heimsoth et al. |
| 5,941,949 A | 8/1999 | Pedersen |
| 5,941,988 A | 8/1999 | Bhagwat et al. |
| 5,951,694 A | 9/1999 | Choquier et al. |
| 5,961,586 A | 10/1999 | Pedersen |
| 5,978,848 A | 11/1999 | Maddalozzo, Jr. et al. |
| 6,088,515 A | 7/2000 | Muir et al. |
| 6,108,715 A | 8/2000 | Leach et al. |
| 6,157,944 A | 12/2000 | Pedersen |
| 6,167,432 A | 12/2000 | Jiang |
| 6,173,332 B1 | 1/2001 | Hickman |
| 6,289,461 B1 | 9/2001 | Dixon |
| 6,338,086 B1 | 1/2002 | Curtis et al. |
| 6,370,570 B1 | 4/2002 | Muir et al. |
| RE38,598 E | 9/2004 | Frese, II et al. |
| 7,007,070 B1 | 2/2006 | Hickman |
| 7,080,127 B1 | 7/2006 | Hickman |
| 7,100,069 B1 | 8/2006 | Hickman |
| 7,130,888 B1 | 10/2006 | Hickman |
| 2001/0056547 A1 | 12/2001 | Dixon |
| 2002/0035451 A1 | 3/2002 | Rothermel |
| 2002/0052932 A1 | 5/2002 | Curtis et al. |
| 2003/0037134 A1* | 2/2003 | Hickman |
| 2005/0210118 A1* | 9/2005 | Hickman |
| 2006/0282520 A1* | 12/2006 | Hickman |

FOREIGN PATENT DOCUMENTS

| | | |
|---|---|---|
| EP | 0648038 A2 | 4/1995 |
| EP | 0384339 B1 | 4/1997 |
| EP | 0483576 B1 | 1/1998 |
| EP | 0540151 B1 | 11/1998 |
| EP | 0732834 B1 | 1/2003 |
| JP | 06332782 | 12/1994 |
| WO | WO 98/52320 A2 | 11/1998 |
| WO | WO 98/52344 A1 | 11/1998 |

OTHER PUBLICATIONS

Ferrans, James et al. "HyperWeb: A Framework for Hypermedia-Based Environments." ACM SIGSOFT Software Engineering Notes. ACM Press. vol. 17 Issue 5. Nov. 1992. 1-10.*

Bulterman, Dick. "Embedded Video in Hypermedia Documents: Supporting Integration and Adaptive Control." ACM Transactions on Information Systems. vol. 13, No. 4. Oct. 1995. pp. 440-470.*

"Allocation of Equivalent Communication Buffer Sizes in SQLJRA Remote Protocol," *IBM Technical Disclosure Bulletin*, vol. 36, No. 1, pp. 29-31, (Jan. 1993).

"OS/2 EE Database manager SQLJRA Remote Protocol," *IBM Technical Disclosure Bulletin*, vol. 36, No. 1, pp. 33-36, (Jan. 1993).

A. Singleton; *Byte*; "Wired On The Web"; 21 No. 1:77-80 (Jan. 1, 1996).

Adler, Richard M. "Distributed Coordination Models for Client/Server Computing," *Computer Magazine*, pp. 14-22, (Apr. 1995).

Branwyn, Gareth "MOSAIC: Quick Tour for Windows", Ventana Press, pp. 5-7, 57, 124-126, 61-64, 91-104, and 124-126, 1994.

Droms, R. "Dynamic Host Configuration Protocol," Network Working Group Request for Comments: 1541, pp. 1-39, (Oct. 1993).

Hoff, A. "Java and Internet Programming", *Dr. Dobb's Journal*, pp. 56, 58, 60-61 and 101-102, Aug. 1995.

Holtzman, Jeff. "Merge 386: Run Unix and DOS together on an 80386," Byte, pp. cover, 207-208, 211-212, (Dec. 1988).

J.M. Chu et al.; Behavior Research Methods, Instruments & Computers; "Creating a Hypertext Markup Language Documents for an Information Server", 27, No. 2:200-205 (Jan. 1, 1995).

Jellinek, Herb. "The Animator Applet (1.0.2)—example 1," http://199.185.96.71/java/Animator/example.html, printed Jun. 1, 1999.

Mann, Bruce E. et al. "Terminal Servers on Ethernet Local Area Networks," *Digital Technical Journal*, No. 3, pp. 73-87, (Sep. 1986).

P. Davis; Database; "An Interactive Hypermedia Map Viewer"; 18, No. 2:65-67 (Apr./May 1995).

S. Putz, "Interactive information services using world-wide web hypertext," *Computer Networks & ISDN Systems*, Elsevier Science B.V., 27, p. 273-280. 1994.

Schemers, III, R.J. "Ibnamed: a load balancing name server written in Perl—Update," http://www-leland.stanford.edu/.about.docs/ibnanmed/ibnamed.html, pp. 1-5, (Sep. 17, 1995).

T. Tessier; Dr. Dobb's Journal; "Using Javascript to Create Interactive Web Pages A Cross-Platform Object Scripting Language", 21, No. 3:84-97 (Mar. 1, 1996).

Tanenbaum, Andrew S. "Networking in Unix," *Computer Networks*, pp. 434-435, (1989).

Windows NT Networking Guide: Microsoft Windows NT Resource Kit, pp. 79-87, (1995).

Australia Official Action dated Dec. 11, 1998 in AU Appl. No. 76734/96.

PCT "International Preliminary Examination Report" dated Feb. 13, 1998 in Appl. No. PCT/US96/17937.

PCT "Written Opinion" dated Sep. 1, 1997 in Appl. No. PCT/US96/17937.

"European Search Report," dated Feb. 4, 2005 in EP Appl. No. 03000050.9.

U.S. Official Action dated Dec. 13, 2002 in U.S. Appl. No. 10/068,790.

U.S. Official Action dated May 9, 2000 in U.S. Appl. No. 09/247,220.

U.S. Official Action dated Nov. 22, 2000 in U.S. Appl. No. 09/247,220.

U.S. Official Action dated Jul. 3, 2001 in U.S. Appl. No. 09/247,220.

U.S. Official Action dated Jun. 2, 1997 in U.S. Appl. No. 08/556,623.

Europe Official Action dated Feb. 10, 1998 in EP Appl. No. 08/556,623.

\* cited by examiner

METHODS AND APPARATUS FOR MAKING A HYPERMEDIUM INTERACTIVE

CROSS REFERENCE TO RELATED APPLICATIONS

This application is a continuation of application Ser. No. 10/068,790 filed on Feb. 6, 2002 now U.S. Pat. No. 6,691,157, which is a continuation of application U.S. Ser. No. 09/247,220 filed on Feb. 10, 1999, which is now U.S. Pat. No. 6,370,570, which is itself a continuation of application U.S. Ser. No. 08/556,623 filed on Nov. 13, 1995, which is now U.S. Pat. No. 6,088,515, all of which are incorporated herein by reference.

FIELD OF THE INVENTION

The invention relates generally to the field of computer communications and more specifically to the field of remote application processing.

BACKGROUND

A hypermedium is a graphical display which contains a series of graphic and textual images which are referred to as hyperlinks. Each hyperlink typically corresponds to additional information which is available to a user of the hypermedium. For example a hypermedium display might be an encyclopedic article about flight. If the graphical display of the article includes a picture of a rocket, and if the user is able to obtain information about the engine of the rocket by selecting (typically by using a pointing device referred to as a computer mouse) a portion of the display showing the engine, the portion of the picture containing the rocket engine is referred to as a hyperlink. That is, the portion of the picture containing the engine is a link to information about the engine. The activation of a hyperlink causes the hypermedium to request a data file of the desired information from the program actually controlling the hypermedium.

When a hypermedium is used in conjunction with a network, for example the world wide web or the internet, a user on a client node on the network first accesses what is termed a home page or a web page. This home page or web page is obtained from another node on the net, termed a network server, and is displayed on the client node by a program termed a network browser or web browser. In such a case, when the user selects the hyperlink (in the previous example, the portion of the display showing the rocket engine) a request is made to the network browser for the data file containing the requested information. The network browser on the user's node establishes communication with the network node, the data server, having data corresponding to the requested hyperlink. In this case the node having information about the rocket engine contains the information required by the hyperlink.

Although hypermedium has been used to transfer information to a user in the manner just discussed, it is desirable to be able to use a hypermedium display to interactively execute applications such as database programs located on another computer, an application execution server, on the network. The present invention relates to a method and apparatus to accomplish this task.

SUMMARY OF THE INVENTION

The invention relates to a system of making a hypermedium page interactive to thereby permit an application to be executed on one node and the results displayed and data entered on another node. In one embodiment the system includes a client node, a network server node and an application execution server node interconnected by a communication link. A hyperlink on the hypermedium page is displayed on the client node and a hyperlink configuration file (corresponding to the hyperlink on the client node) is located on the network server node. In one embodiment, a client agent is located on the client node and a server agent is located on the application execution server node. A communication link is created by the client agent between the client agent on the client node and the server agent on the application execution server node in response to data in the hyperlink configuration file. The system also includes an application on the application execution server node which executed on the application execution server node in response to the communications link between the client agent and the server agent. The application running on the application execution node then communicates with the client agent through the server agent. The client agent on the client node is responsible for receiving data input from the user and transferring the data to the application on the application execution node and receiving data from the application on the application execution node and displaying data output to the user on the client node.

The invention also relates to a method of making a hypermedium page interactive. The method includes the steps of selecting a hyperlink on the hypermedium page displayed on a client node; retrieving (from a server node to the client node) a hyperlink configuration file corresponding to the hyperlink and starting a client agent on the client node. The method further includes the steps of creating a communications link between a server agent on an application execution server and the client agent; starting the application on the application execution server in response to the connection; communicating data between the client agent on the client node and application on the application execution node; and managing the display and input of data on the client node.

BRIEF DESCRIPTION OF THE DRAWINGS

Other features and benefits of the invention can be more clearly understood with reference to the specification and the accompanying drawings in which.

DETAILED DESCRIPTION OF THE INVENTION

Figure 1:
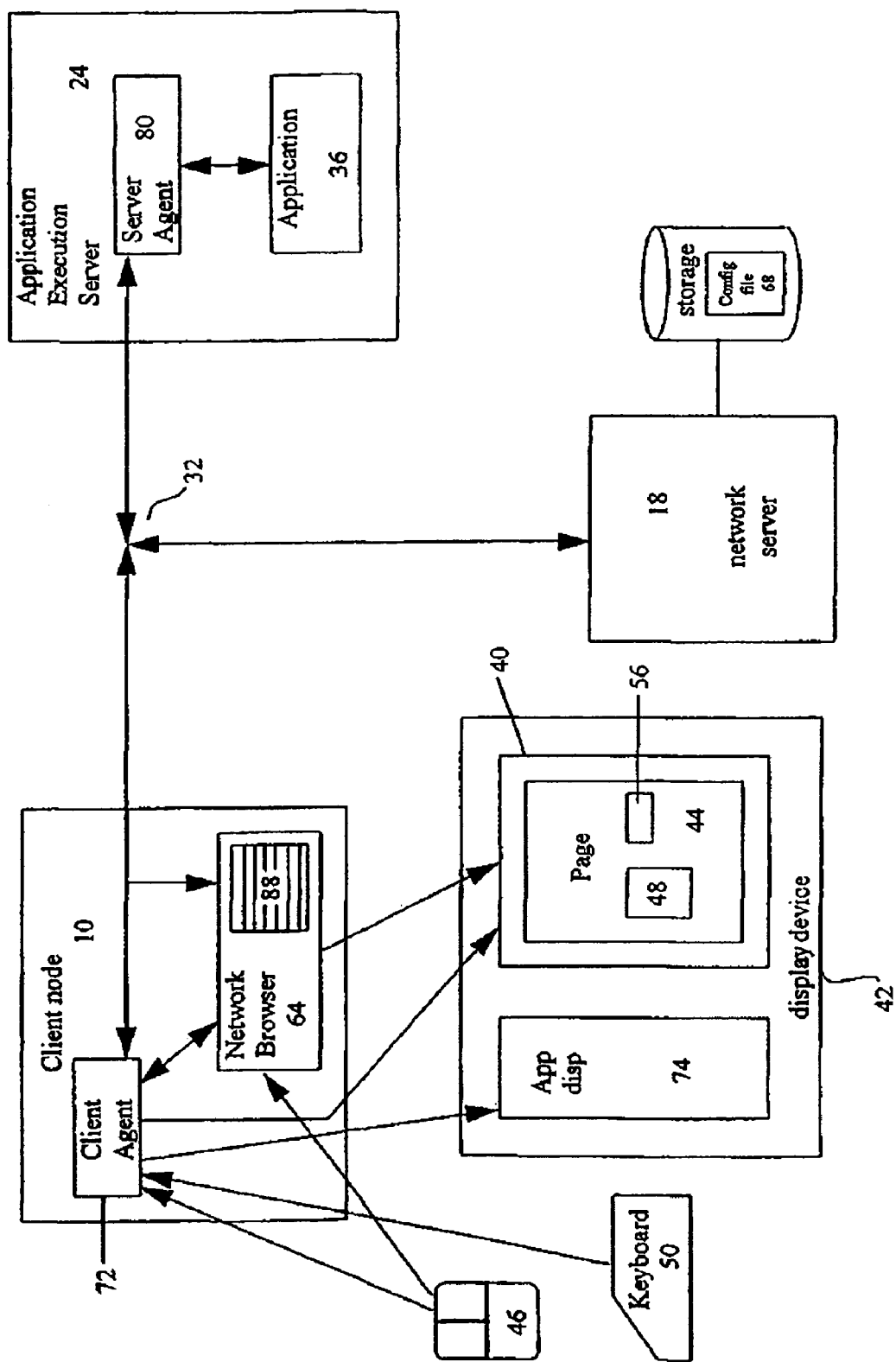
FIG. 1 is a block diagram of an embodiment of the system of the invention.

Referring to FIG. 1, and in brief overview, an embodiment of an interactive hypermedium system of the invention includes a client node 10, a network server node 18 and an application execution server node 24 interconnected by a communications link 32, herein referred to without any loss of generality as a network or web. Although only one client node 10, network server node 18 and application execution server node 24, are shown in FIG. 1 for clarity, an actual network may include many such nodes. Alternatively, the services provided by each of the nodes listed may be combined in one or more nodes. For example, the application execution server and the network server may in fact be the same node. In the extreme it is possible for all functions to be performed by the same node, although such would not typically be the case. In addition, although only one application 36 is shown on the application execution server 24, in reality, an application execution server node 24 typically includes many applications 36. Each node on the network or web 32 includes a processor, which may vary significantly from other processors on the web 32 in terms of computing power and associated hardware. Further, the applications 36 available for execution on each node may be different.

A user on a client node wishing to run the application program 36 which is located on the application execution server 24 on the web 32 does so through a graphical user interface 40, which is herein referred to without any loss of generality as a hypermedium, located on the client node 10. The graphical interface is displayed on a graphical display device 42. Data is entered by the users through a mouse 46 and a keyboard 50 located on the client node 10. The graphical display or page 44 which the user first views on the hypermedium 40 is referred to herein without any loss of generality as the home page or web page of the application 36. A page 44 or home page of the hypermedium 40 includes a graphic link 48 or textual link 56 herein referred to without any loss of generality as a hyperlink. The web page is displayed by a process 64 referred to herein without any loss of generality as a network browser 64 executing on the client node 10.

The network browser 64 obtains the first page or web page 44 from a network server node 18 and displays the web page 44 on the hypermedium 40 for the user to view on the graphical display device 42. When the user selects an application program 36 to execute (by selecting a graphical 48 or textual 56 hyperlink using the mouse 46 or keyboard 50) the network browser 64 obtains a network configuration file 68 corresponding to the selected application 36 from a predetermined network server 18 and starts a client agent 72 which will communicate with the selected application 36. This will be discussed in more detail below.

The client agent 72 reads the configuration file 68 and establishes a communications link to a server agent 80 on the application execution server 24 specified by the configuration file 68. In one embodiment, the configuration file 68 includes the name of the application and the node location of the application 36 corresponding to the hyperlink 48, 56. The configuration file may also contain optional information such as authentication or authorized user information. Server agent 80 performs the operations necessary (such as authentication) to permit the client agent 72 access to the application 36, and once access is permitted, starts the application 36 requested by the user. Once the application 36 is executing on the application execution server, the application 36 communicates through the server agent 80 directly with the client agent 72 without intervention by the network browser 64. The client agent 72 is then responsible for receiving data from the user through the mouse 46 and keyboard 50 and transmitting it to the application program 36 the application execution server 24. Similarly, the client agent 72 is responsible for receiving data from the application 36 on the application execution server 24 and displaying the data in an application display window 74 on the graphical display device 42 on the client node 10. It should be noted that the application display window 74 may be located within the boundaries or outside the boundaries of the hypermedium 40. When the application 36 is completed server agent 80 instructs the client agent 72 to disconnect the communication link 32 between the client agent 72 and the server agent 80 and the server agent waits for the next connection.

Figure 2:
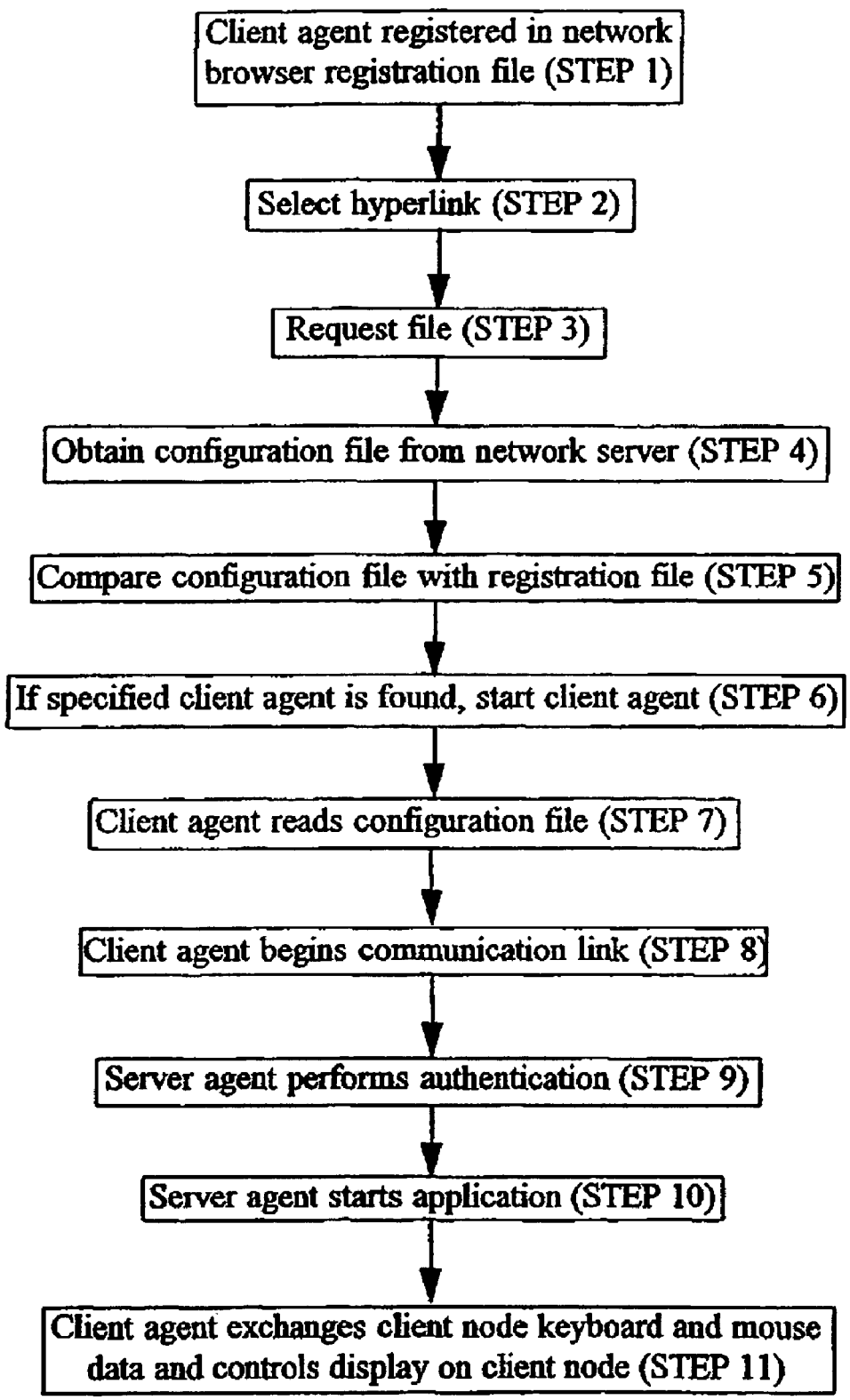
FIG. 2 is a flow chart of the operation of system of the invention shown in FIG. 1.

FIG. 2 depicts the operation of the system in more detail. Initially, the client agent 72 is registered (Step 1) with the network browser 64 of the client node 10 and an entry is made in the network browser's registration file 88 (FIG. 1). This entry permits the network browser 64 to start the client agent 72 whenever a given file type is requested by the hyperlink 48, 56 of the hypermedium 40. In this case the client agent 72 is designed to permit a user on the client node 10 to execute and interact with a remote application 36 on an application execution server node 24. The client agent 72 would be registered with the network browser 64 such that whenever a hyperlink 48, 56 requested the given file type (for example .RMT for remote execution) from the network browser 64, the network browser 64 would start the client agent 72 which would permit remote execution and interaction with an application 36 resident on an application execution server 24. The invoking of the client agent 72 is discussed in more detail below.

Next, when a user wishes to execute an application from a hypermedium environment, for example a database program, the hypermedium 40 is displayed in a manner that is well known to those skilled in the art. When the user selects a hyperlink 48, 56 on the page 44 of the hypermedium (Step 2) by using the mouse 46 or keyboard 50 on the client node 10, a request is made to the network browser 64 for the corresponding data file (Step 3). In this example, the filetype (.RMT) is requested.

The network browser 64 obtains the corresponding configuration file 68 from the network server 18 which is specified in the file request made by the hyperlink 48, 56 to the network browser 64 (Step 4). The network browser 64 then compares the obtained configuration file 68 with the registration file 88 of client agent names which it maintains (Step 5). If the client agent 72 specified by the configuration file 68 is found in the registration file 88, the client agent 72 is started (Step 6).

The invoked client agent 72 reads the configuration file 68 (Step 7), and based upon the information in the configuration file 68, begins to establish a communication link with the server agent 80 on the application execution server 24 (Step 8), in this case the sales database application execution server (generally 24).

Considering the process of beginning the communications link of step 8 (FIG. 2) in more detail, communication begins with the server agent 80 monitoring communication activity on the network 32. At this point, no protocol assumptions are made by the server agent 80 beyond those necessary for the transport layer. Similarly, the client agent 72 also makes no assumption of the communications protocol beyond that required by the transport layer. Once the server agent 80 determines that a client agent 72 is attempting to communicate with it, the server agent 80 transmits a message to the client agent 72 indicating that service is available.

Once the client agent 72 determines that service is available on the application execution server node 24, the client agent 72 transmits a message to the server agent 80 indicating that it is ready to proceed with the communication protocol. Once the server agent 80 has responded that it is ready to continue the communication protocol, the client agent 72 enables the protocol necessary for it to run the application 36. In response to the message from the client agent 72, the server agent 80 also enables the required protocol. The server agent 80 then transmits a message using the required protocol indicating that the client agent's request has been received and accepted.

In response the client agent 72 and the server agent 80 exchange a set of messages which negotiate the parameters under which communications will occur. Once negotiations are complete, the client agent 72 and the server agent 80 are able to communicate as necessary for the application 36 to be run by the user.

Once the communications protocol has been established and the server agent 80 has authenticated the client agent 72 (Step 9) (for example determining that the user has permission to read and write to the database) the application 36 (Step 10) is run on the application execution server 24. At this point application 36 running on the application execution server 24 is communicating via the server agent 80 with the client agent 72 on the client node 10. The client agent 72 is now responsible for transmitting data input by the user using the mouse 46 and keyboard 50 to the application 36 running on the application execution server 24. Further, the client agent 72 is responsible for receiving data for display from the application 36 and displaying that data in the application window 74 on the graphical display device 42 of the client node 10.

It should be noted that the underlying presentation protocol which passes data to a transport layer such as TCP/IP must be capable of transferring graphical information. Examples of such protocols which may be used for interactive hypermedia communication include public domain X-WINDOWS protocol and the proprietary ICA protocol of Citrix Systems Inc.

Thus the above described system permits a user on a client node 10, which may have very limited resources, to start and interact with an application program 36 located on another application execution server node 24. The application 36 then runs on the application execution server node 24 and the data is input and the results displayed on the client node 10.

These and other examples of the concept of the invention illustrated above are intended by way of example and the actual scope of the invention is to be determined solely from the following claims.

What is claimed is:

1. A system for making a hypermedium page interactive, the hypermedium page displayed by a network browser, the system comprising:
   a client node executing a browser application, said browser application displaying a hypermedium page including a hyperlink identifying an application;
   a network server transmitting, in response to selection of said hyperlink, a network configuration file to said client node, said network configuration file corresponding to said identified application;
   a client agent executing on said client node, said client agent establishing, responsive to data in said configuration file, a communications link with an application execution server hosting said application,
   wherein said application execution server executes said hosted program and transmits application output to said client agent for display without intervention by said browser application.

2. The system of claim 1 wherein said hypermedium page includes a graphical hyperlink identifying an application.

3. The system of claim 1 wherein said hypermedium page includes a textual hyperlink identifying an application.

4. The system of claim 1 wherein said network configuration file specifies an application execution server hosting said application.

5. The system of claim 1 wherein said network configuration file includes authentication information.

6. The system of claim 1 wherein said network configuration file includes information relating to authorized users of said identified application.

7. The system of claim 1 wherein said network server node and said application execution server comprise the same physical server.

8. The system of claim 1 further comprising a server agent executing on said application execution server, said server agent transmitting application output to said client agent without intervention by the network browser.

9. The system of claim 1 wherein said client agent communicates with said server agent via a presentation protocol.

10. The system of claim 9 wherein said client agent communicates with said server agent via the ICA protocol.

11. A method for making a hypermedium page interactive, the hypermedium page displayed by a network browser, the method comprising:
   (a) executing, by a client node, a browser application displaying a hypermedium page including a hyperlink identifying an application;
   (b) transmitting, by a network server in response to selection of the hyperlink, a network configuration file to the client node, the network configuration file corresponding to the identified application;
   (c) establishing, by a client agent executing on the client node in response to data in the network configuration file, a communications link with an application execution server hosting the identified application,
   (d) executing, by the application execution server hosting the identified application, the hosted program; and
   (e) transmitting, by the application execution server, application output to the client agent for display without intervention by the browser application.

12. The method of claim 11 wherein step (a) comprises executing, by a client node, a browser application displaying a hypermedium page including a graphical hyperlink identifying an application.

13. The method of claim 11 wherein step (a) comprises executing, by a client node, a browser application displaying a hypermedium page including a textual hyperlink identifying an application.

14. The method of claim 11 wherein step (b) comprises transmitting, by a network server in response to selection of the hyperlink, a network configuration file to the client node, the network configuration file corresponding to the identified application and specifying an application execution server hosting the application.

15. The method of claim 11 wherein step (b) comprises transmitting, by a network server in response to selection of the hyperlink, a network configuration file to the client node, the network configuration file corresponding to the identified application and including authentication information.

16. The method of claim 11 wherein step (b) comprises transmitting, by a network server in response to selection of the hyperlink, a network configuration file to the client node, the network configuration file corresponding to the identified application and including information relating to authorized users of the identified application.

17. The method of claim 11 wherein step (b) comprises transmitting, by a network server in response to selection of the hyperlink, a network configuration file to the client node, the network configuration file corresponding to the identified application and specifying the network server as the application execution server.

18. The method of claim 11 further comprising the step of transmitting, by a server agent executing on the application execution server, application output to the client agent without intervention by the network browser.

19. The method of claim 11 further comprising the step of transmitting, by a server agent executing on the application execution server, application output to the client agent via a presentation protocol.

20. The method of claim 19 further comprising the step of transmitting, by a server agent executing on the application execution server, application output to the client agent via the ICA protocol.

21. An article of manufacture having computer-readable code means embodied thereon for making a hypermedium page displayed by a network browser interactive, the article of manufacture comprising:

(a) computer-readable program means for executing, by a client node, a browser application displaying a hypermedium page including a hyperlink identifying an application;

(b) computer-readable program means for transmitting, by a network server in response to selection of the hyperlink, a network configuration file to the client node, the network configuration file corresponding to the identified application and specifying an application execution server hosting the application;

(c) computer-readable program means for establishing, by a client agent executing on the client node, a communications link with the application execution server, (d) computer-readable program means for executing, by the application execution server hosting the identified application, the hosted program; and (e) computer-readable program means for transmitting, by the application execution server, application output to the client agent for display without intervention by the browser application.

* * * * *